US010436582B2

(12) United States Patent
Gupta

(10) Patent No.: US 10,436,582 B2
(45) Date of Patent: Oct. 8, 2019

(54) DEVICE ORIENTATION DETECTION

(71) Applicant: HERE Global B.V., Veldhoven (NL)

(72) Inventor: Vishisht Vijay Gupta, El Cerrito, CA (US)

(73) Assignee: HERE Global B.V., Eindhoven (NL)

( * ) Notice: Subject to any disclaimer, the term of this patent is extended or adjusted under 35 U.S.C. 154(b) by 269 days.

(21) Appl. No.: 14/676,990

(22) Filed: Apr. 2, 2015

(65) Prior Publication Data
US 2016/0290799 A1 Oct. 6, 2016

(51) Int. Cl.
*G01C 9/00* (2006.01)
*B60W 40/076* (2012.01)

(52) U.S. Cl.
CPC ............. *G01C 9/00* (2013.01); *B60W 40/076* (2013.01); *B60W 2550/142* (2013.01)

(58) Field of Classification Search
CPC . B60W 2550/142; B60W 40/076; G01C 9/00; F41G 3/00–24
See application file for complete search history.

(56) References Cited

U.S. PATENT DOCUMENTS

| 4,885,977 A * | 12/1989 | Kirson ............. F41G 5/14 89/41.05 |
| 6,847,887 B1 * | 1/2005 | Casino ............. G01C 21/32 340/995.18 |
| 2006/0139619 A1 * | 6/2006 | Fujii ............. G01B 11/02 356/4.03 |
| 2010/0118116 A1 | 5/2010 | Tomasz et al. |
| 2010/0220173 A1 | 9/2010 | Anguelov et al. |
| 2014/0168377 A1 | 6/2014 | Cluff et al. |
| 2014/0184799 A1 | 7/2014 | Kussel |
| 2015/0025801 A1 * | 1/2015 | Linton ............. G01C 19/04 701/530 |

FOREIGN PATENT DOCUMENTS

WO WO2013096704 6/2013

OTHER PUBLICATIONS

Kummerle R, Autonomous Driving in a Multi-level Parking Structure (Year: 2009).*
Bo Li et al., A 4-point Algorithm for Relative Pose Estimation of a Calibrated Camera with a Known Relative Rotation Angle, Research Paper, accessed Feb. 17, 2015.

* cited by examiner

*Primary Examiner* — Charles J Han
(74) *Attorney, Agent, or Firm* — Lempia Summerfield Katz LLC

(57) ABSTRACT

An orientation or position of a device may be determined through a determination of a slope of a path currently being traveled by a vehicle. The slope of the path may be determined from data indicating a movement of the vehicle provided by sensors of a data acquisition device coupled with the vehicle. A tilt value of the data acquisition device using the sensors of the data acquisition device may also be determined. A position of the data acquisition device may be established based on the slope of the path and the tilt value of the data acquisition device.

20 Claims, 8 Drawing Sheets

US 10,436,582 B2

DEVICE ORIENTATION DETECTION

FIELD

The following disclosure relates to device orientation detection, and more specifically, to determining a position of a data acquisition device relative to a terrain being traveled by a vehicle.

BACKGROUND

Vehicles commonly travel roadways and other thoroughfares as guided by an operator or driver. The vehicles may take any shape or form of transportation device, and occasionally may be an automobile. The vehicle may have a device attached which is configured to gather data relating to, or indicative of, the geographic area traveled by the vehicle. The data acquisition device may have an optimum, or acceptable, position and/or orientation for gathering such data. For example, the data acquisition device may include sensors that must be oriented at a certain perspective to the terrain, and a certain distance above the terrain, to acquire the most representative data of the geographic area. As such, if the data acquisition device is not configured in the optimum, or acceptable position, the data gathered may not be sufficiently accurate or representative of the geographic area traveled.

SUMMARY

In an embodiment, a method or apparatus may provide an orientation or position of a device. The orientation or position may be determined through a determination of a slope currently being traveled by a vehicle. The slope may be determined from data indicating a movement of the vehicle and/or from sensors elevated with respect to the vehicle. A tilt value of the data acquisition device using the sensors of the data acquisition device may also be determined. A position of the data acquisition device may be established based on the slope and the tilt value of the data acquisition device.

BRIEF DESCRIPTION OF THE DRAWINGS

Example embodiments of the present invention are described herein with reference to the following drawings.

DETAILED DESCRIPTION

Data gathered by a device during the acquisition of geographic data may be used to determine a position and/or orientation of the device. For example, the device when coupled with a vehicle may acquire pitch, height, travel distance, velocity, as well as other data during a data acquisition session as the vehicle travels through a geographic area. This data may indicate a movement of the vehicle, from which a terrain slope may be determined. A device tilt may also be determined from the device data. Position and/or orientation of the device during the acquisition of the data may be determined from the terrain slope and device tilt.

Various data acquisition techniques, such as Light Detection and Ranging (LIDAR) or photogrammetry methods, may be used to take measurements of objects in a geographic area. For example, as is described further below with respect to FIGS. 5A-C, a vehicle may be equipped with a geographic measurement device, which may use LIDAR technology. The geographic measurement, or data acquisition, device may be attached or otherwise physically coupled with the top of the vehicle to achieve an optimal height and/or position for recording geographic measurements and other data of objects in the geographic area.

In an embodiment, a vehicle may be equipped with a LIDAR based data acquisition device for recording mapping and/or navigation data along geographic areas of roadways. The data acquisition device may take pictures and record measurements of buildings, structures, and/or other objects along the roadway. The data of the data acquisition device may be developed into a three dimensional (3D) model of the geographic area around roadways that includes representations of the objects around the roadways. The same equipment used to gather such mapping and/or navigation data may also be used to detect a device position and/or orientation as the vehicle is traveling. Further, such detection may be valuable in causing an operator of the vehicle, or the vehicle itself, to take actions to avoid acquiring data with the device in a non-optimal and/or not acceptable position. Therefore, preliminary, continuous, and/or periodic monitoring, as well as accuracy checks of the data after the data is acquired, may be performed to ensure proper positioning of the device for data acquisition. Further, through comparisons of determined positions of the device, this detection, or determination, may be used to identify faults in existing device position sensors as well as device positioning actuators.

Figure 1:
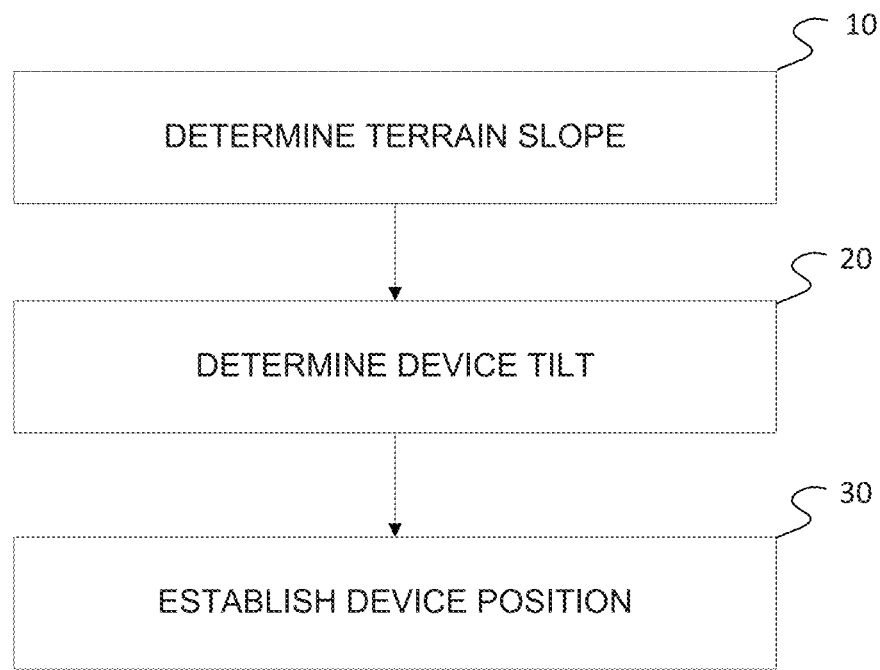
FIG. 1 illustrates a flow chart of an example embodiment for device orientation detection.

FIG. 1 illustrates a flow chart of an example embodiment for device orientation detection. As presented in the following sections, the acts may be performed using any combination of the components indicated in FIG. 4, FIG. 5A, or FIG. 6. For example the term controller may refer to either controller 200 or processor 300 and the following acts may be performed by data acquisition device 122, server 125, a vehicle 401, or a combination thereof. Additional, different, or fewer acts may be provided. The acts are performed in the order shown or other orders. The acts may also be repeated.

In act 10, a terrain slope is determined. The terrain slope is an inclination or declination of a terrain traveled by a vehicle through a geographic area. The slope may be determined using any technique, and measured by any standard. For example, the slope may be determined using a gyroscope and measured as an angle relative to a reference to a plane or axis, such as a horizontal or vertical plane or axis. The slope may also be determined from data measured that is reflective of the movement of the vehicle, such as position and/or acceleration data over time. The terrain may be any terrain. For example, the terrain may be a roadway surface or an off-road terrain. A path of the vehicle follows the terrain. In an embodiment, the terrain slope may be a slope of a path of the vehicle.

In act 20, a device tilt is determined. The device is a data acquisition device. The device may be configured to acquire data relating to a geographic area traveled by a vehicle. The device may also be configured to acquire data relating to a movement of a vehicle, such as orientation, position, and/or acceleration measurements for the vehicle. In an embodiment, the device is attached to a roof of a vehicle and may be configured into multiple positions or orientations relative to the vehicle and/or a terrain the vehicle is traveling. For example, the device may include a vertical component, and the vertical component may be manipulated into multiple positions between a vertical, or standing, orientation and a horizontal, or laying, orientation.

The tilt of the device may be determined using any technique and/or device. For example, gyroscopes and/or accelerometers coupled with the device may be used to determine a tilt of the device. The tilt may be measured with respect to any reference. For example, the tilt may be measured as an angle of orientation of the vertical component of the device with respect to a reference plane or axis.

In act 30, a position of the device is established. The position may be a position of multiple possible and/or configurable positions of the device. The position may be any orientation relative to the vehicle and/or terrain of the vehicle coupled with the device. For example, the device may have two configurable positions, standing or laying. The existence of the device in either of the positions may be established. Also, in an embodiment, any number of configurable positions between the standing and laying positions may be a possible configuration for the device. In an embodiment, the established position may be compared with a desired position to determine whether the device is oriented properly.

The position may be established using any technique. In an embodiment, the terrain slope and the device tilt are used to determine the position of the device. For example, the device tilt indicates a position of the device relative to a reference plane. As is indicated above, however, the orientation of the device relative to the terrain is important, and the terrain may not be aligned with the reference plane. The terrain slope then is used to provide a reference for the positioning of the terrain relative to the reference plane, or a plane having a position known relative to the reference plane. Thus, by using both the terrain slope and the device tilt an orientation of the device specifically relative to the terrain may be determined, for example by subtracting the value of the terrain slope from the value of the device tilt, or other mathematical operations.

Figure 2:
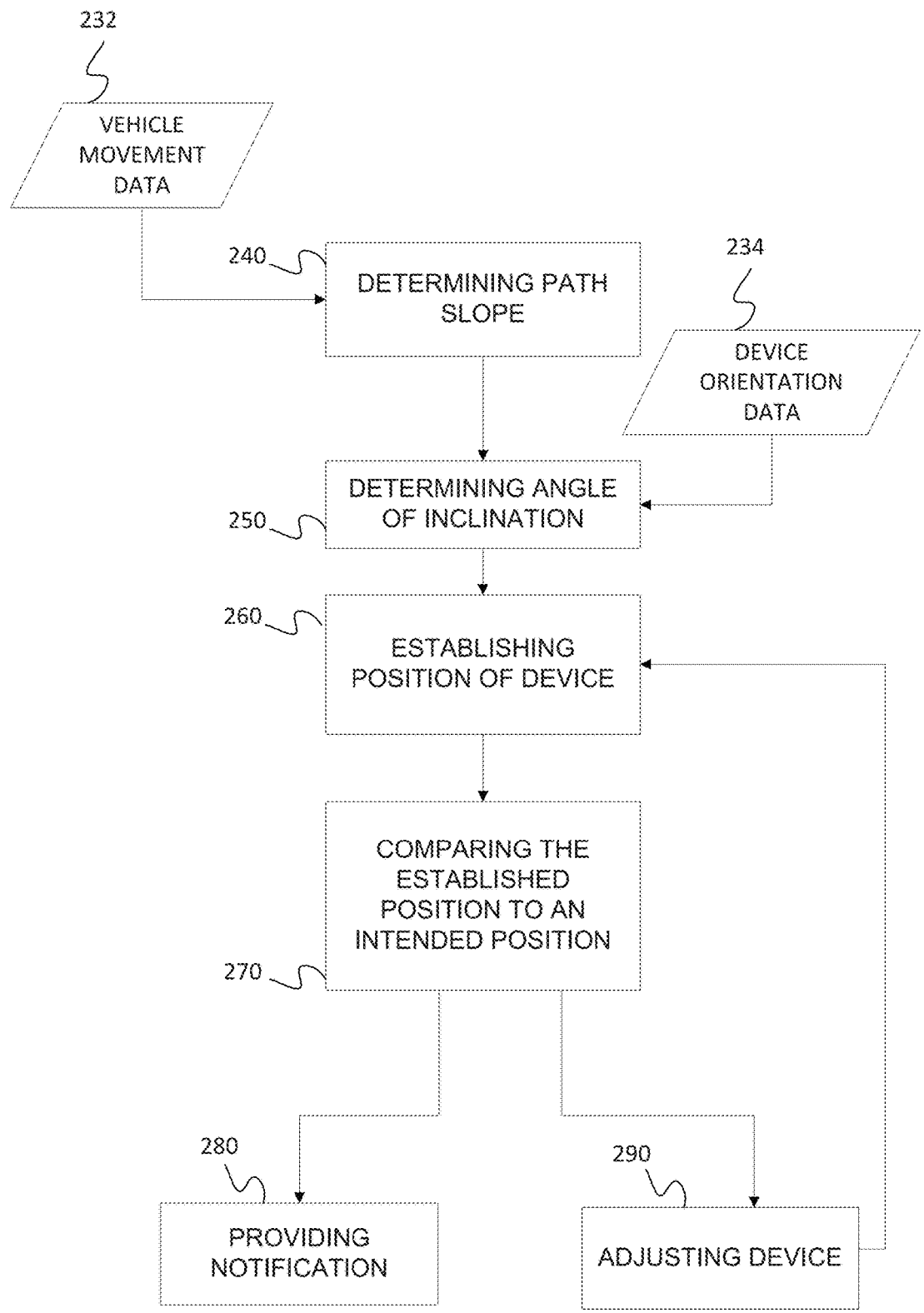
FIG. 2 illustrates flow chart of another example embodiment for device orientation detection.

FIG. 2 illustrates another flow chart of an example embodiment device position detection. As presented in the following sections, the acts may be performed using any combination of the components indicated in FIG. 4, FIG. 5A, or FIG. 6. For example the term controller may refer to either controller 200 or processor 300 and the following acts may be performed by data acquisition device 122, server 125, a vehicle 401, or a combination thereof. Additional, different, or fewer acts may be provided. The acts are performed in the order shown or other orders. The acts may also be repeated.

In act 240, a path slope is determined. The path may be a path traveled by a vehicle. The slope of the path may be determine from data indicating a movement of the vehicle 232. The data indicating movement of the vehicle 232 may be provided by sensors of a data acquisition device coupled with the vehicle, for example the position circuitry 207 and/or movement circuitry 208 as described below with respect to FIG. 5A.

The data indicating movement of the vehicle 232 may be any data recorded that is characteristic of movement of the vehicle. For example, the vehicle movement data 232 may be data indicative of various positions of the vehicle over time, velocities, accelerations, and/or any other data indicative of vehicle movement. In an embodiment, the data indicating a movement of the vehicle 232 may involve data indicating a change in elevation of the vehicle over a period of time. The data indicating movement of the vehicle 232 may also include data indicating a distance traveled by the vehicle over the period of time. The distance traveled may be a distance traveled as measured in a two dimensional horizontal plane perpendicular to an axis of the elevation change data. Both the elevation change data and the distance traveled data may be determined from location data, such as three dimensional (3D) location data acquired by the data acquisition device and/or other sensors over the period of time. For example, an elevation change may be determined as a change in a vertical axis between two or more location measurements. Similarly, the distance traveled may be determined as a distance between two points of the other two dimensions of the location, such as axes orthogonal to the vertical axis.

In an embodiment, the slope of the path is determined using Equation 1.

$$m=\tan^{-1}(Y_t/X_t) \quad \text{Equation 1:}$$

In Equation 1, m is the slope of the path, $Y_t$ is the change in elevation of the vehicle over the period of time, and $X_t$ is the distance traveled by the vehicle over the period of time.

The data indicating movement of the vehicle 232 may be data indicating a velocity of the vehicle. The data indicating a velocity of the vehicle may involve data indicating a vertical and horizontal component of the velocity of the vehicle. A slope of the path of the vehicle may be determined from the velocity data using Equation 2.

$$m=\tan^{-1}(V_v/V_h) \quad \text{Equation 2:}$$

In Equation 2, m is the slope of the path, $V_v$ is the velocity component in the vertical direction, and $V_h$ is the velocity component in the horizontal direction.

In act 250, an angle of inclination of a data acquisition device is determined. The data acquisition device is coupled with the vehicle. The angle of inclination may be determined from device orientation data 234. The device orientation data may be provided by sensors of the data acquisition device, for example the movement circuitry 208 as described below with respect to FIG. 5A. In an embodiment, the angle of inclination may be determined relative to a reference plane, such as a horizontal or vertical reference plane.

Figure 3A:
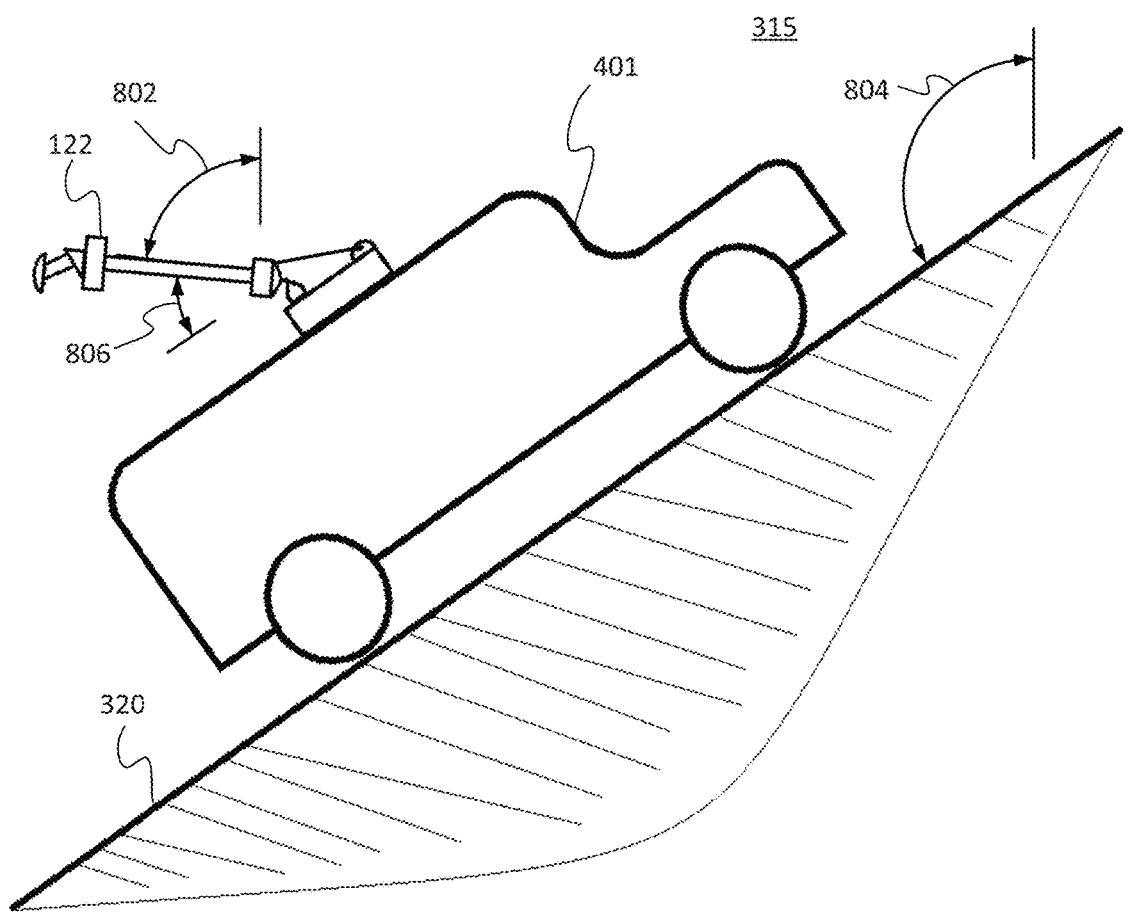
FIGS. 3A-D illustrate orientations of a data acquisition device.

In act 260, a position of the data acquisition device is established. The position of the data acquisition device may be established based on the slope of the path determined in act 240 and the angle of inclination of the data acquisition device determined in act 250. In an embodiment that involves a common reference plane for the determination of the slope of the path and the angle of inclination, as is shown in FIG. 3A, a value determined for a measurement of the slope of the path 804 may be subtracted from a value determined for the angle of inclination 802 to determine a position, or angle, 806 relative to the path of the vehicle 401 coupled with the data acquisition device 122.

Referring again to FIG. 2, in act 270, the position of the data acquisition device established in act 260 may be compared to an intended position. An intended position may be any position. In an embodiment, the intended position is a position of an established set of positions. For example, intended positions may be established, such as a vertically oriented position of 90 degrees, or perpendicular, to the path. Another position may be a horizontally oriented position of 0 degrees, or parallel, to the path. The intended position may be measured as an angle, and an established position angle and an intended position angle may be compared to determine if the device is configured in the intended position. An orientation angle of the data acquisition device may be the result of the comparison. The orientation angle may be determined as an absolute value of the differences indicated by the comparison. For example, the orientation angle may be determined using Equation 3.

$$\theta = |\rho_{aq} - m - \rho_{des}|$$ Equation 3:

In Equation 3, $\theta$ is the orientation angle, $\rho_{aq}$ is the angle of inclination of the data acquisition device, m is the slope of the path, and $\rho_{des}$ is a desired angle of inclination of the data acquisition device when in the intended position. In an embodiment, the orientation angle may be compared to a threshold value or range to determine whether the device is in the intended position. For example, orientation angles of less than or equal to 5 degrees (i.e. a 5 degree threshold) may indicate that the device is configured in the intended position.

Also, other sensors and/or components such as limit switches or proximity sensors may be specifically configured to detect a position of the data acquisition device. If a reading from such sensors and/or components does not match the established position, a position sensor error may be indicated in the sensors and/or components.

In act 280, a notification is provided. The notification may be provided when the comparing in act 270 indicates that the established position does not match the intended position. For example, a notification may be provided as an audible and/or visible warning to an operator of the vehicle. The warning may be provided by the output interface 211 of the data acquisition device 122 as described below with respect to FIG. 5A. The warning may provide text that provides instruction to the operator, such as "Device Not Positioned Properly," or "Device Position Error." The notification may involve a buzzer, ringing, or otherwise audible alarm to indicate the warning to the operator. The notification may similarly warn of a position sensor error of the device.

In act 290, the device is adjusted. The device may be adjusted through an adjustment of the angle of inclination. The angle of inclination may be adjusted to achieve the intended position if and/or when the angle of inclination does not match, or come sufficiently close to, the intended position. The device may be adjusted using any device and/or technique, for example an actuator 505 as described below with respect to FIG. 5A may be used. The adjustment may be manual or automatic. For example, a vehicle driver or operator may manually engage a switch or control of the adjustment of the device. In another example, the device may automatically trigger the operation of the actuator based on a detected improperly positioned or oriented device so as to achieve proper positioning.

Establishing a position of the device may be repeated. In an embodiment, establishing position of the device may be repeated during an adjusting of the device, or periodically while the device is in operation or preparing for operation. As such, the adjusting of the device and providing notification may also be repeated.

Figure 3B:
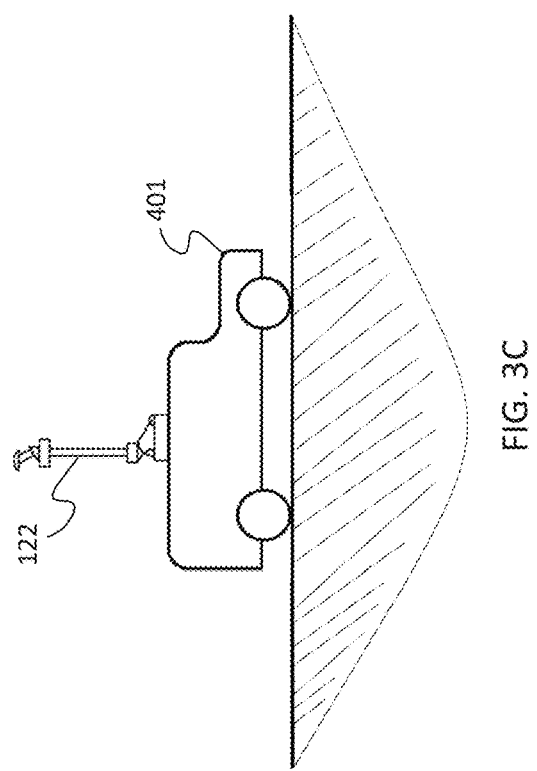
Figure 3C:
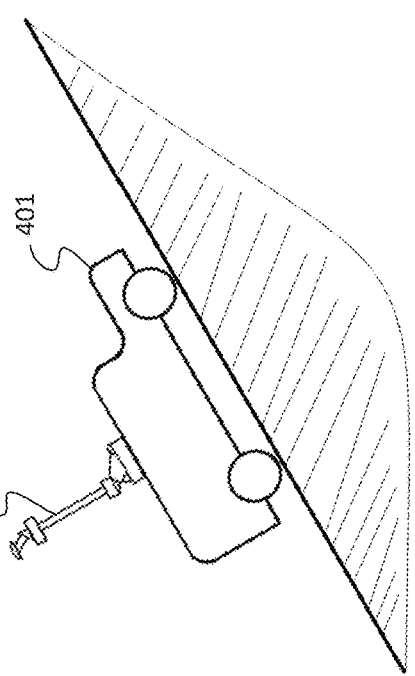
Figure 3D:
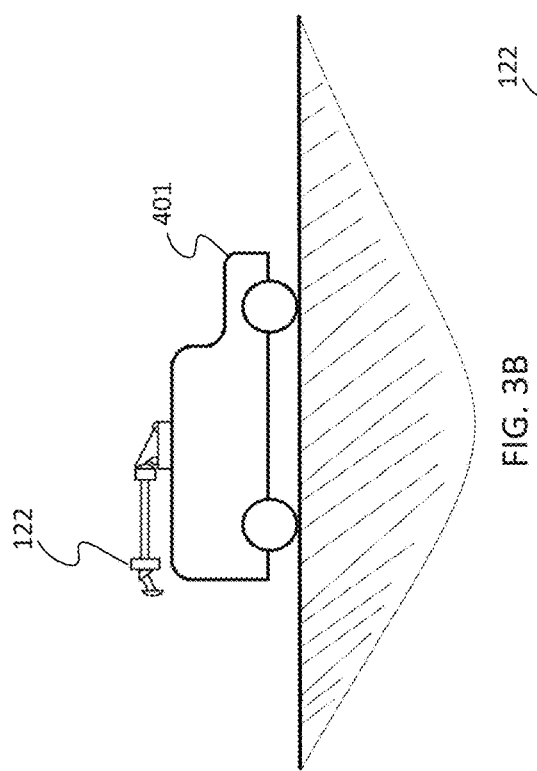

FIGS. 3A-3D illustrate various positions for a vehicle 401, coupled with a data acquisition device 122, that is traveling a path 320 through a geographic area 315. The path 320 has a slope 804. Also, as is illustrated in FIG. 3A, the data acquisition device is oriented with a tilt 802 relative to a vertical reference axis. In the embodiment shown in FIGS. 3A-3D there are two acceptable positions for the data acquisition device 122. The data acquisition device 122 may be oriented vertically relative to the path, such as is illustrated in FIGS. 3C and 3D, or the data acquisition device 122 may be oriented horizontally relative to the path, as is indicated in FIG. 3B. The position of the data acquisition device 122 as illustrated in FIG. 3A may be an improper position, and as such detected using the techniques described herein. Further, by using the techniques described herein, a slope 804 of the path 320 may be taken into account for inclines or declines of the path such that false data acquisition device position readings may be avoided. For example, the device 122 as positioned in a vertical orientation, but with the vehicle 401 traveling on an inclined path, would not result in a false, non-vertical, position determination, as may be indicated in the situation illustrated in FIG. 3D using other techniques.

Figure 4:
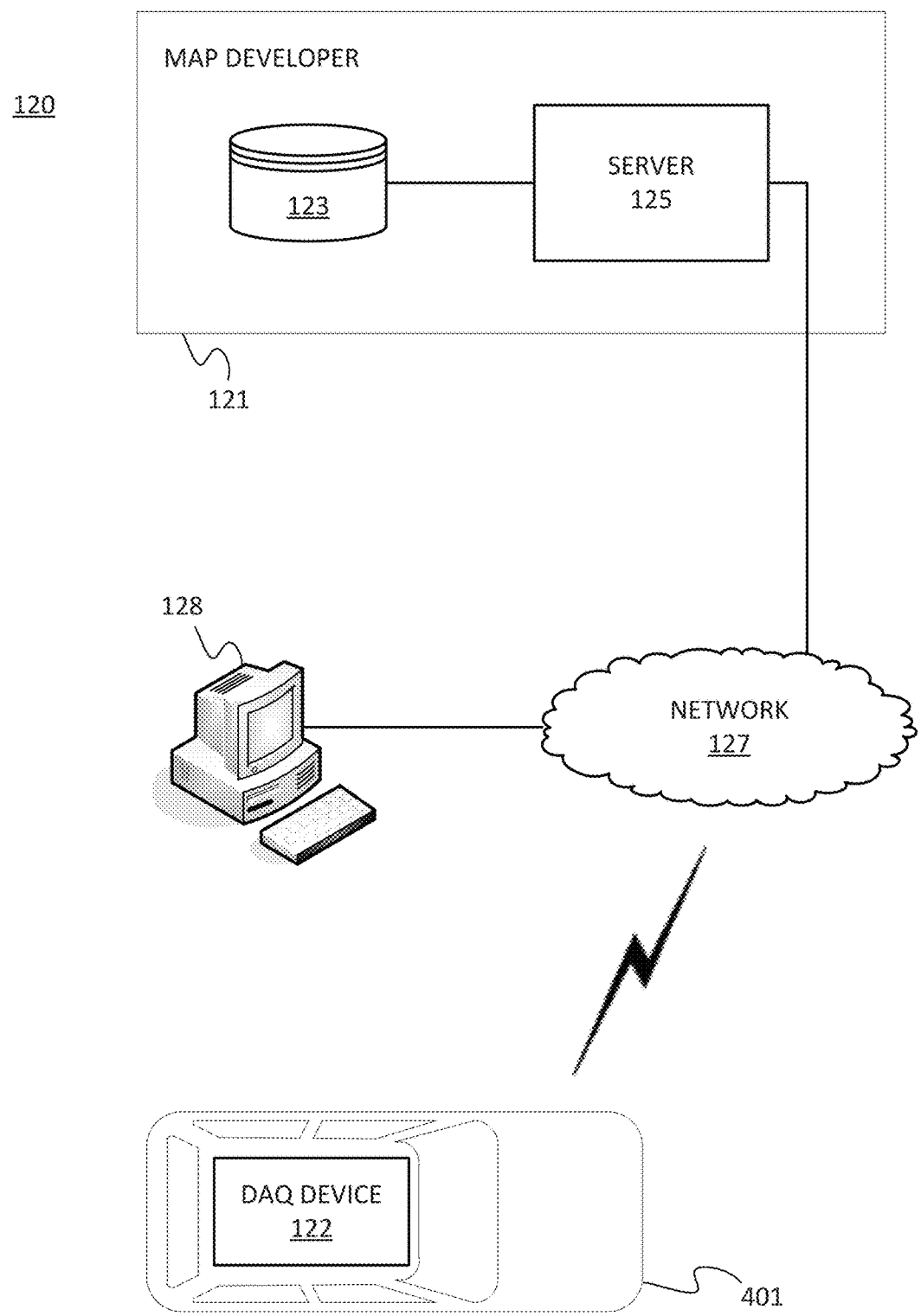
FIG. 4 illustrates an example system for device orientation detection.

FIG. 4 illustrates an exemplary system 120 for device orientation detection. The system 120 may include a developer system 121, an optional workstation 128, a data acquisition (DAQ) device 122, and a network 127. The DAQ device 122 may be associated, coupled, or otherwise integrated with a vehicle 401. Additional, different, or fewer components may be provided. For example, many DAQ devices 122 and/or the workstations 128 may connect with the network 127.

The developer system 121 includes a server 125 and a database 123. The developer system 121 may include computer systems and networks of a system operator such as HERE or NOKIA Corporation. The optional workstation 128 is a general purpose computer including programming specialized for the following embodiments. The workstation 128 includes at least a memory, a processor, and a communication interface. The geographic database 123 may be partially or completely stored in the DAQ device 122 or with other systems of the vehicle 401.

The developer system 121 and the DAQ device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or assisted or automated driving related applications. The geographic data may include data representing a road network or system including road segment data and node data. The geographic data may also include data generated and/or acquired by the DAQ device 122. The road segment data represent roads or road branches, and the node data represent the ends or intersections of the roads. The road segment data and the node data indicate the location of the roads and intersections as well as various attributes and geometries of the roads and intersections, which may include the locations of stationary obstructions in a roadway. Other formats than road segments and nodes may be used for the geographic data. The geographic data may include geometries of roads, road segments, or road branches determined from sparse data as indicated above.

The DAQ device 122 may include one or more detectors or sensors as a positioning system built or embedded into or within the interior of the DAQ device 122. Alternatively, the DAQ device 122 uses communications signals for position determination. The DAQ device 122 receives location data from the positioning system. The server 125 may receive sensor data configured to describe a position of a DAQ device, or a controller of the DAQ device 122 may receive the sensor data from the positioning system of the DAQ device 122. The DAQ device 122 may also include a system for tracking DAQ device 122 and/or vehicle 401 movement, such as rotation including yaw rates and/or angles, velocity, and/or acceleration. Movement information may also be determined using the positioning system. The DAQ device 122 may use the detectors and sensors to provide data indicating a location of a vehicle.

The DAQ device 122 may communicate location, movement, and object information via the network 127 to the server 125. The server 125 may use the location and/or movement information received from the DAQ device 122 to associate the DAQ device 122 with a geographic region, or a path or road of a geographic region, described in the geographic database 123. Server 125 may also associate the DAQ device 122 with a geographic region, or a road of a geographic region, manually.

The server 125 may receive location and movement information from multiple DAQ devices 122 over the network 127. The location, movement, and object information may be in the form of DAQ device data or data points. The server 124 may compare the DAQ device data with data of a road system stored in the database 123. In this way, the positions of vehicles associated with the DAQ devices 122 may be determined relative to a road network or a geographic area. Also, the DAQ device data may be assigned to, or associated with, particular road branches as is described above.

The computing resources for device orientation detection may be divided between the server 125 and the DAQ device 122. In some embodiments, the server 125 performs a majority of the processing. In other embodiments, the DAQ device 122 performs a majority of the processing. In addition, the processing is divided substantially evenly between the server 125 and the DAQ device 122. For example, data may be collected by the DAQ device 122 and obstructions may be detected by the server 125.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5A:
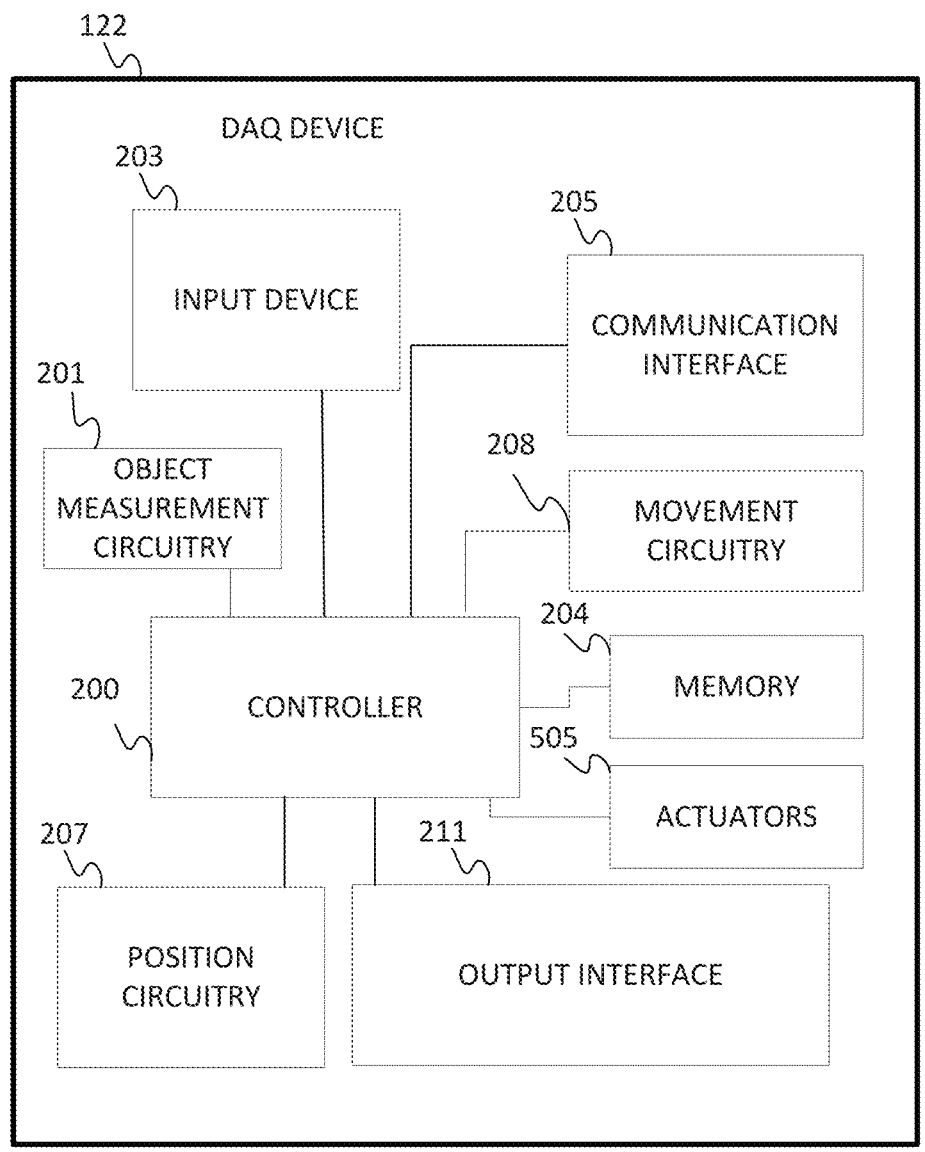
FIG. 5A-C illustrate example data acquisition devices of the system of FIG. 4.
Figure 5B:
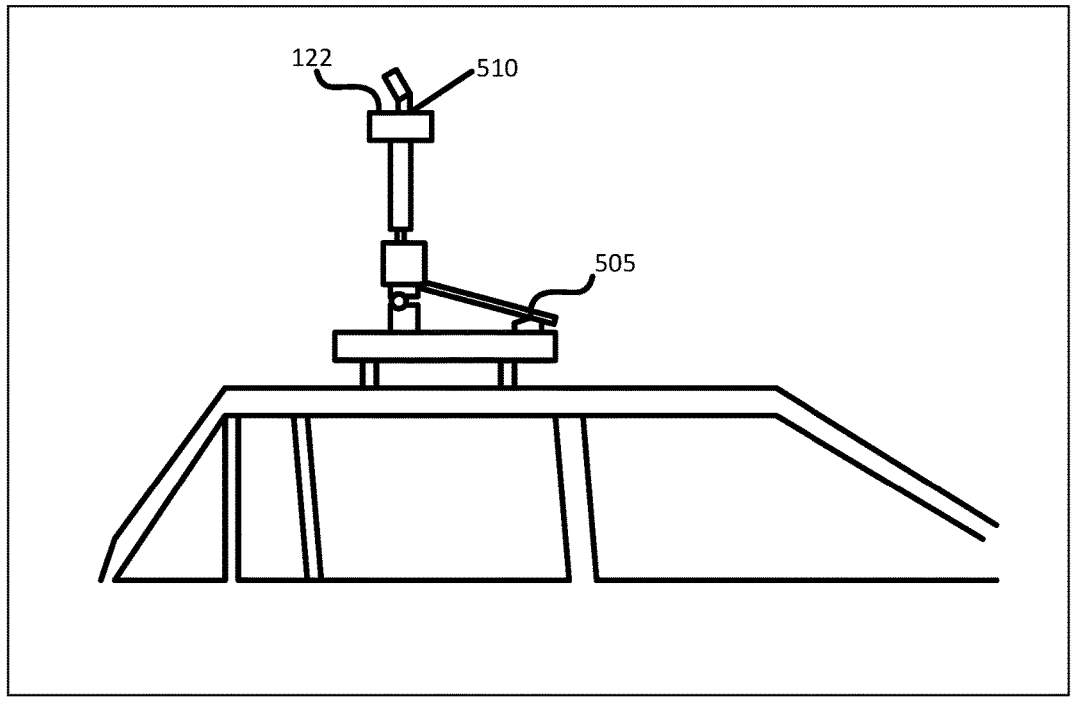
Figure 5C:
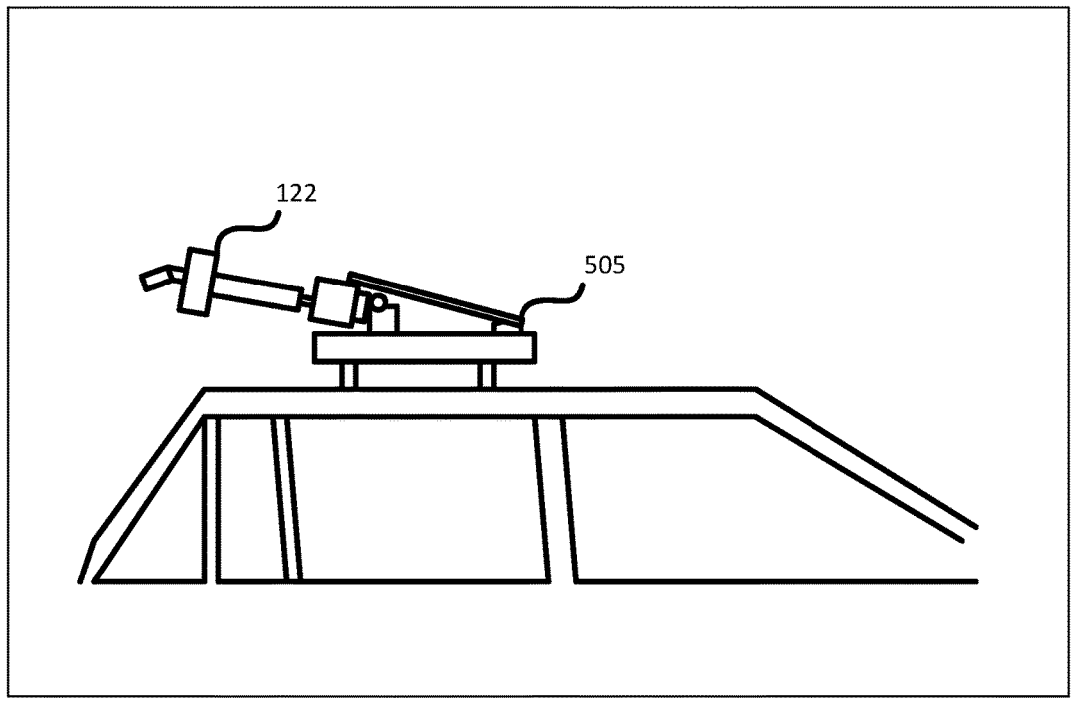

FIG. 5A illustrates an exemplary DAQ device 122 of the system of FIG. 4.

The DAQ device 122 includes a controller 200, a memory 204, an input device 203, a communication interface 205, position circuitry 207, movement circuitry 208, object measurement circuitry 201, one or more actuators 505, and an output interface 211. The output interface 211 may present visual or non-visual information such as audio information. Additional, different, or fewer components are possible for the DAQ device 122. The DAQ device 122 is a tablet computer, a smart phone, a mobile phone, a personal digital assistant (PDA), a notebook computer, a personal navigation device (PND), a portable navigation device, an assisted driving device, an automated driving or control device, and/or any other known or later developed DAQ device. The positioning circuitry 207, which is an example of a positioning system, is configured to determine a geographic position of the DAQ device 122 and/or an associated vehicle 401. The movement circuitry 208, which is an example a movement tracking system, is configured to determine movement of a DAQ device 122 but may operate in place of, or in correlation with, other movement sensors and/or circuitry integrated with a vehicle associated with the DAQ device 122. The position circuitry 207 and the movement circuitry 208 may be separate systems, segments of the same positioning or movement circuitry system, or integrated systems of a vehicle associated or otherwise integrated with the DAQ device. In an embodiment, components as described herein with respect to the DAQ device 122 may be implemented as a vehicle, or coupled with a vehicle.

In an embodiment, the memory 204 may be operable to store a plurality of data points associated with a vehicle, the DAQ device, and/or objects around the vehicle. The plurality of data points may be generated by a DAQ device at particular times while traveling a road or path through a geographic area.

The positioning circuitry 207 may include suitable sensing devices that measure the traveling distance, speed, direction, and so on, of the DAQ device 122. The positioning system may also include a receiver and correlation chip to obtain a GPS signal. Alternatively or additionally, the one or more detectors or sensors may include an accelerometer and/or a magnetic sensor built or embedded into or within the interior of the DAQ device 122. The accelerometer is operable to detect, recognize, or measure the rate of change of translational and/or rotational movement of the DAQ device 122. The magnetic sensor, or a compass, is configured to generate data indicative of a heading of the DAQ device 122. Data from the accelerometer and the magnetic sensor may indicate orientation of the DAQ device 122. The DAQ device 122 receives location data from the positioning system. The location data indicates the location of the DAQ device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the DAQ device 122. The positioning system may also include a receiver and correlation chip to obtain a GPS signal. The DAQ device 122 receives location data from the positioning system. The location data indicates the location of the DAQ device 122 or a vehicle associated with the DAQ device 122.

The movement circuitry 208 may include gyroscopes, accelerometers, magnetometers, or any other device for tracking or determining movement of a DAQ device. The gyroscope is operable to detect, recognize, or measure the current orientation, or changes in orientation, of a DAQ device. Gyroscope orientation change detection may operate as a measure of yaw, pitch, or roll of the DAQ device. The movement circuitry 208 may be used alone, or with the positioning circuitry 207 to determine DAQ device 122 movement. The movement circuitry may include a yaw rate sensor such as a gyroscopic device that measures the device's angular velocity around a vertical axis. The yaw rate sensor may measure a yaw rate using any technique. For example piezoelectric type and/or micromechanical type yaw rate sensors may be used. Further, the movement circuitry 208 may be mounted or otherwise coupled at an elevated position of the DAQ device 122. For example, the movement circuitry may be coupled with the DAQ device 122 as the highest component of the device. In an embodiment, the movement circuitry 208 is mounted at the top of the DAQ device 122, such as at position 510 indicated in FIG. 5B. Alternatively, the movement circuitry may be coupled at an elevated position of the DAQ device, but not as the highest component. The elevated position may provide for the acquisition of data for determination of device alignment and/or positioning. In an embodiment, the movement circuitry of the DAQ device 122 is installed above a vehicle coupled with the DAQ device 122. In an embodiment, the movement circuitry may be coupled with a DAQ device 122 that is attached to the top of a vehicle. For example, the movement circuitry may be installed on an elevated protrusion of the DAQ device 122 that extends away from the vehicle.

Positioning and movement data obtained from a DAQ device may be considered geographic data, device data, object data, other data, and/or DAQ device data, and may be used to determine an orientation of the DAQ device.

The input device 203 may be one or more buttons, keypad, keyboard, mouse, stylus pen, trackball, rocker switch, touch pad, voice recognition circuit, or other device or component for inputting data to the DAQ device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The communication interface 205 is configured to send data such as DAQ device or vehicle movement, heading, and position data to a server 125. The position circuitry 207 is configured to determine the current location of the DAQ device and/or coupled vehicle.

The actuators 505 may include one or more devices configured to enact movement and/or positioning of the DAQ device 122. For example, the actuators 505 may include mechanical components, pneumatic components, electrical components, hydraulic components, or combinations thereof. In an embodiment, such as that shown in FIGS. 5B and 5C, the actuators 505 are configured to raise and/or lower the DAQ device 122 into various positions. For example, a portion of the device, such as a part of the object measurement circuitry 201 and/or movement circuitry 208, may be configured to be at the maximum height of the DAQ device 122. The actuators 505 may be configured to transition and/or otherwise adjust the DAQ device between positions. Conversely, the actuators 505 may be configured to return the components to the original position. For example, the actuators 505 may include a linear actuator configured to raise and lower the DAQ device 122 into vertical and horizontal positions. Also, the actuators 505 may be configured to allow for a positioning of the components at any position between the vertical and horizontal positions of the DAQ device 122.

The object measurement circuitry 201 includes sensors and/or other devices configured to take measurements of objects in vicinity of the DAQ 122 device. The measurements may include position and/or geometrical properties of the objects. The measurements may be provided as object data. In an embodiment, the object data may be measured using LIDAR techniques. LIDAR, also known as LiDAR, Lidar, or other similar representations, is a remote sensing technology that measures distance by illuminating a target with a laser and analyzing the reflected light. Typically LIDAR uses ultraviolet, visible, or near infrared light to image objects and can be used with a wide range of targets. In an embodiment, a LIDAR data acquisition system may be attached or otherwise integrated with the DAQ device 122. There may also be a positioning system integrated with the LIDAR system such as a Global Positioning System (GPS) to provide a base reference in a global coordinate system for the data acquired by the LIDAR system. The positioning system may be the position circuitry 207.

The object measurement circuitry 201 may also include cameras or other image capture devices configured to capture images of a geographic area, and objects therein, surrounding the DAQ device 122. The cameras may be spaced so as to record a full 360 degrees of visibility around the DAQ device 122, or any reduced degree of visibility. In an embodiment, four 24 mega-pixel digital single-lens reflex (DSLR) cameras are configured to capture images of the surrounding area of the DAQ device 122.

In an embodiment, the DAQ device 122 is coupled with a vehicle. The DAQ device includes an object sensor configured to determine locations of objects relative to the vehicle, such as the object measurement circuitry 201. The DAQ device 122 also includes a velocity sensor, or other motion sensor, configured to determine velocity of the vehicle, such as the movement circuitry 208. The DAQ device also includes a processor and/or controller 207 that is coupled with the object sensor and the velocity sensor. The controller 207 is configured to determine a slope of a path currently being traveled by the vehicle, the slope of the path determined from data indicating a movement of the vehicle provided by sensors of a data acquisition device coupled with the vehicle. The controller 207 is also configured to determine an angle of inclination of the data acquisition device using the sensors of the data acquisition device, and establish a position and/or orientation of the data acquisition device based on the slope of the path and the angle of inclination of the data acquisition device.

Figure 6:
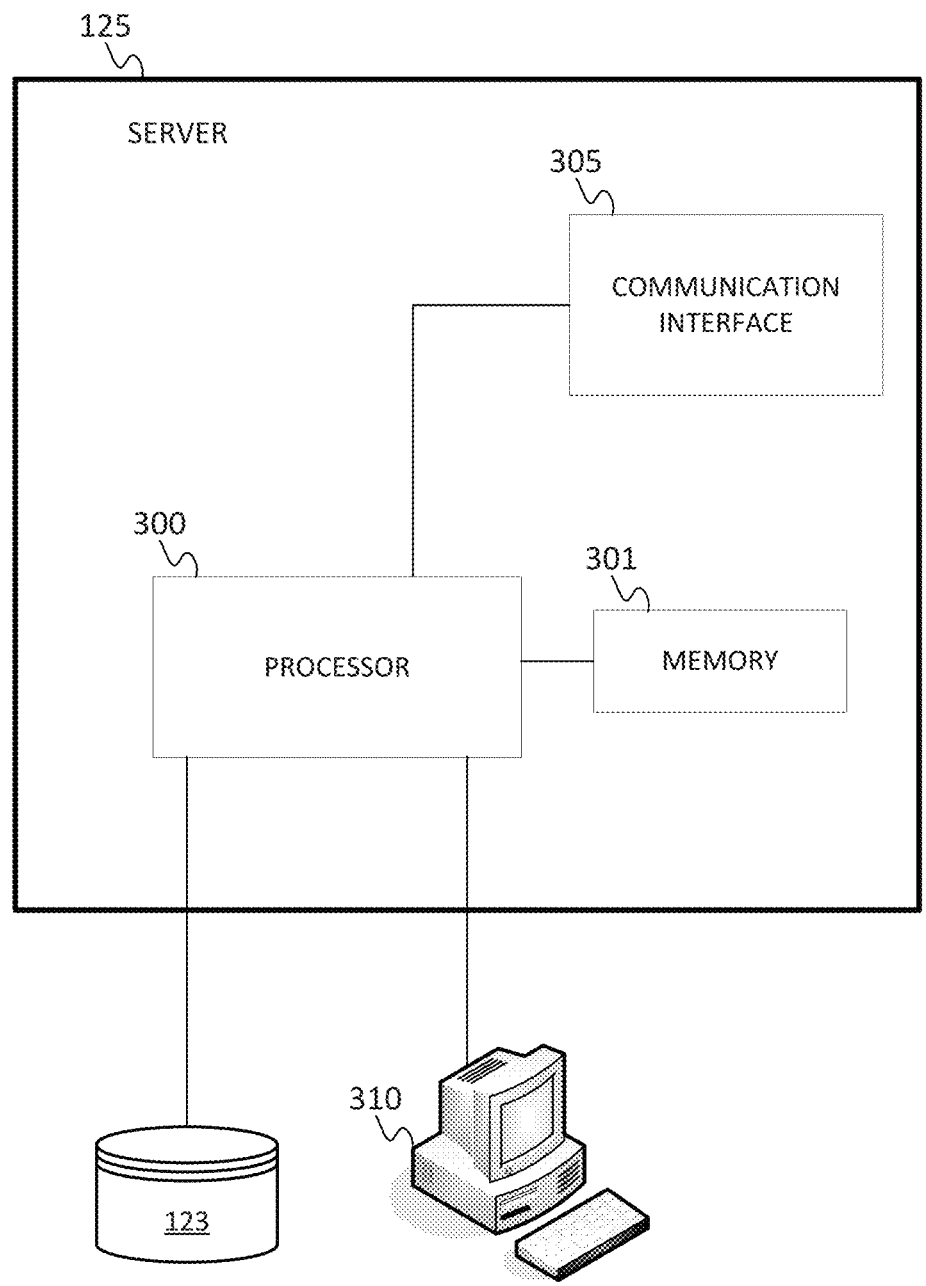
FIG. 6 illustrates an example server of the system of FIG. 4.

FIG. 6 illustrates an exemplary server of the system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of inputs made via the DAQ device 122.

In an embodiment, the memory 301 may be operable to store a plurality of data points associated with DAQ devices and/or vehicles. The plurality of data points may be generated by DAQ devices at particular times while traveling a road or path through a geographic area.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the DAQ device 100, such as a secure digital (SD) memory card.

In an embodiment, the memory 204, 301 may be operable to store a plurality of DAQ device data points comprising data indicating positions and/or velocities of vehicles traveling on a roadway of a geographic area. The memory 204,

301 may also be operable to store object data relating to objects of the geographic area. The memory 204, 301 may also be operable to store orientation data of the DAQ device 122.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, the instructions may be executed by a processor and/or controller, and are configured to cause a device or system at least to determine a slope of a path currently being traveled by a vehicle, the slope of the path determined from data indicating a movement of the vehicle provided by sensors of a data acquisition device coupled with the vehicle. The instructions may be further configured to cause the device or system to determine a tilt value of the data acquisition device using the sensors of the data acquisition device, and establish a position of the data acquisition device based on the slope of the path and the tilt value of the data acquisition device. For example, the instructions may provide the logic indicated by the pseudo-coded algorithm below.

---

Desired_Position(Device Up position)~0 degrees
Desired_Position(Device Down position)~90 degrees
If(|Tilt of Device − Slope of Ground − Desired Position|< Threshold)
    Device_in_desired_position = true
Else
    Device_in_desired_position = false

---

Where a false value may trigger the execution of further instructions, such as instructions to provide notifications and/or adjust the device as is described herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   determining, by a processor, a slope angle of a path traveled by a vehicle, the slope angle of the path determined from data indicating a movement of the vehicle provided by sensors of a data acquisition device coupled with the vehicle, wherein the data acquisition device is configured to collect data for a three-dimensional (3D) model of an area around the path traveled by the vehicle;
   determining, by the processor, an angle of inclination of the data acquisition device using the sensors of the data acquisition device; and
   collecting road network data including information for at least one road segment for the path traveled by the vehicle through control of an actuator to set a position of a control arm relative to the vehicle, wherein the control arm comprises the data acquisition device, wherein the position of the control arm is based on the slope angle of the path and the determined angle of inclination of the data acquisition device.

2. The method of claim 1, wherein the data indicating a movement of the vehicle comprises data indicating a change in elevation of the vehicle over a period of time and data indicating a distance traveled by the vehicle over the period of time.

3. The method of claim 2, wherein the data indicating the change in elevation of the vehicle over a period of time and data indicating the distance traveled by the vehicle over the period of time is derived from at least two positions of the vehicle measured within the period of time.

4. The method of claim 3, wherein the slope angle of the path is determined with the following function:

$$m = \tan^{-1}(Y_t/X_t),$$

wherein m is the slope angle of the path, $Y_t$ is the change in elevation of the vehicle over the period of time, and $X_t$ is the distance traveled by the vehicle over the period of time.

5. The method of claim 1, wherein the data indicating a movement of the vehicle comprises data indicating a velocity of the vehicle, the velocity comprising a vertical component and a horizontal component.

6. The method of claim 5, wherein the slope angle of the path is determined with the following function:

$$m = \tan^{-1}(V_v/V_h),$$

wherein m is the slope angle of the path, $V_v$ is the velocity component in the vertical direction, and $V_h$ is the velocity component in the horizontal direction.

7. The method of claim 1, wherein establishing the position of the data acquisition device comprises a comparison of the established position to an intended position.

8. The method of claim 7, wherein establishing the position of the data acquisition device comprises establishing the position based on an orientation angle, and the orientation angle is determined with the function:

$$\theta = |\rho_{aq} - m - \rho_{des}|,$$

wherein $\theta$ is the orientation angle, $\rho_{aq}$ is the angle of inclination of the data acquisition device m is the slope angle of the path, and $\rho_{des}$, is a desired angle of inclination of the data acquisition device when in the intended position.

9. The method of claim 8, wherein establishing the position of the data acquisition device comprises establishing the position based on a comparison of the orientation angle, $\theta$, to a threshold.

10. The method of claim 7, further comprising:
    providing a notification when the comparing indicates that the established position does not match the intended position.

11. The method of claim 7, further comprising:
    adjusting the angle of inclination of the data acquisition device to achieve the intended position.

12. An apparatus comprising:
    at least one processor;
    and at least one memory including computer program code and operable to store data indicative of movement of a vehicle and an angle of a data acquisition device;
    the at least one memory and the computer program code configured to, with the at least one processor, cause the apparatus at least to;
    determine a slope angle of a path currently being traveled by a vehicle, the slope angle of the path determined from the data indicating a movement of the vehicle provided by sensors of the data acquisition device coupled with the vehicle;
    determine the angle of inclination of the data acquisition device using the sensors of the data acquisition device; and
    control, via an actuator, a position of a control arm relative to the vehicle, wherein the control arm comprises the data acquisition device, to collect road network data, including at least one road segment or at least one node, representing the path traveled by the vehicle, wherein the position of the control arm is based on the slope angle of the path and the determined angle of inclination of the data acquisition device.

13. The apparatus of claim 12, wherein the data indicating a movement of the vehicle comprises data indicating a change in elevation of the vehicle over a period of time and data indicating a distance traveled by the vehicle over the period of time.

14. The apparatus of claim 13, wherein the data indicating the change in elevation of the vehicle over a period of time and data indicating the distance traveled by the vehicle over the period of time is derived from at least two positions of the vehicle measured within the period of time.

15. The apparatus of claim 12, wherein the data indicating a movement of the vehicle comprises data indicating a velocity of the vehicle, the velocity comprising a vertical component and a horizontal component.

16. The apparatus of claim 12, wherein the position of the data acquisition device is determined through a comparison of the established position to an intended position.

17. The apparatus of claim 16, wherein the position of the data acquisition device is determined using a threshold for an intended position of the data acquisition device.

18. A non-transitory computer readable medium including instructions that when executed by a processor are configured to cause the processor at least to:

determine a slope angle of a path currently being traveled by a vehicle, the slope angle of the path determined from data provided by sensors of a data acquisition device coupled with the vehicle;

determine a tilt value of the data acquisition device using the sensors of the data acquisition device; and control via an actuator, a position of a control arm relative to the vehicle, wherein the control arm comprises the data acquisition device, to collect road network data representing the path traveled by the vehicle, wherein the position of the control arm is based on the slope angle of the path and the determined tilt value of the data acquisition device.

19. The non-transitory computer readable medium of claim 18, wherein the instructions are further configured to cause the apparatus at least to:

provide a notification when the established position does not match an intended position.

20. The non-transitory computer readable medium of claim 18, wherein the instructions are further configured to cause the apparatus at least to:

adjust the tilt angle of the data acquisition device to achieve an intended position when the established position does not match the intended position.

* * * * *